(12) United States Patent
Lee et al.

(10) Patent No.: US 7,468,839 B2
(45) Date of Patent: Dec. 23, 2008

(54) BACKLIGHT UNIT AND METHOD OF MANUFACTURING A POLARIZATION FILM EMPLOYED IN THE SAME

(75) Inventors: Jung Hoon Lee, Chungcheongbuk-do (KR); Sang Gon Lee, Chungcheongbuk-do (KR); Kang Yoon Kim, Chungcheongbuk-do (KR); Chang Jong Kim, Chungcheongbuk-do (KR); Kab Jin Hwang, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/406,246

(22) Filed: Apr. 19, 2006

(65) Prior Publication Data

US 2006/0262397 A1 Nov. 23, 2006

(30) Foreign Application Priority Data

May 23, 2005 (KR) .................... 10-2005-0042908

(51) Int. Cl.
*G02B 27/28* (2006.01)

(52) U.S. Cl. .................... 359/486; 359/900; 349/96
(58) Field of Classification Search .............. 359/486
See application file for complete search history.

(56) References Cited

U.S. PATENT DOCUMENTS

| | | | |
|---|---|---|---|
| 5,061,050 A * | 10/1991 | Ogura | 359/490 |
| 6,972,827 B2 * | 12/2005 | Mi | 349/200 |
| 2002/0163723 A1 * | 11/2002 | Suzudo | 359/495 |
| 2002/0191286 A1 * | 12/2002 | Gale et al. | 359/486 |
| 2003/0231395 A1 * | 12/2003 | Nakai | 359/558 |
| 2004/0114070 A1 * | 6/2004 | Huang | 349/96 |
| 2004/0165126 A1 * | 8/2004 | Ooi at el. | 349/96 |
| 2005/0078374 A1 * | 4/2005 | Taira et al. | 359/569 |
| 2005/0088739 A1 * | 4/2005 | Chiu et al. | 359/486 |
| 2005/0243447 A1 * | 11/2005 | Lee et al. | 359/865 |

* cited by examiner

*Primary Examiner*—Lee Fineman
(74) *Attorney, Agent, or Firm*—Birch, Stewart, Kolasch & Birch, LLP

(57) ABSTRACT

A backlight unit having a polarization film for performing the function of a reflective polarization film, wherein the backlight unit includes a light source, an optical film and a polarization film. The light source emits a light having a certain wavelength, the optical film is located proximate to the light source to transmit the light outputted from the light guiding plate in a certain direction, and the polarization film is located proximate to the optical film. Here, the polarization film has a UV curing resin and lines disposed on the UV curing resin, and polarizes the light transmitted from the optical film. The backlight unit manufactures the polarization film by using an UV curing resin and a metal substance, and thus the manufacture period of the polarization film may be reduced enabling the polarization film to be manufactured in great quantities.

16 Claims, 5 Drawing Sheets

BACKLIGHT UNIT AND METHOD OF MANUFACTURING A POLARIZATION FILM EMPLOYED IN THE SAME

BACKGROUND OF THE INVENTION

1. Field of the Invention

The present invention relates to a backlight unit and a method of manufacturing a polarization film employed in the same. More particularly, the present invention relates to a backlight unit having a polarization film for performing the function of a reflective polarization film and a method of manufacturing the polarization film employed in the same.

2. Description of the Related Art

A Liquid crystal display (hereinafter, referred to as "LCD") displays an image using change of the transmissivity of liquid crystals in LCD. The LCD is not a self light-emitting device, and so includes a backlight unit (hereinafter, referred to as "BLU") for providing a light to a panel located over the BLU.

FIG. 1A is a sectional view illustrating the BLU employed in the LCD.

In FIG. 1A, the BLU 100 is driven by edge-light method, and includes a light source unit 110, a light guiding plate 120, a reflector 130, an optical film 140 and a reflective polarization film 148.

The light source unit 110 has at least one cold cathode fluorescent lamp (hereinafter, referred to as "CCFL") 112 and a light source reflector 114.

The CCFL 112 emits a linear light having a certain wavelength.

A light emitted from the CCFL 112 is reflected by the light source reflector 114 made up of reflective substance and the reflector 130, and then the reflected light is diffused through the whole of the light guiding plate 120 as shown in FIG. 1A.

The optical film 140 includes a diffuser 142, a prism sheet 144 and a protection sheet 146.

The diffuser 142 diffuses or condenses light transmitted from the light guiding plate 120 to maintain constantly the brightness of the BLU 100 and increase the view angle of the LCD.

The prism sheet 144 condenses light transmitted from the diffuser 142 in a direction of the panel so that the brightness of the light transmitted from the BLU 100 to the panel is enhanced.

The protection sheet 146 is located over the prism sheet 144 in order to prevent the prism sheet 144 from dust, etc, and increases the view angle of the LCD narrowed by the prism sheet 144.

Only some of a light provided from the BLU 100 is transmitted through the panel (not shown). For example, P wave of the light provided from the BLU 100 is transmitted through the panel, and S wave of the light is absorbed by the panel. Accordingly, the reflective polarization film 148 is employed in the BLU 100 so as to use the S wave absorbed by the panel.

The reflective polarization film 148 reflects S wave of a light diffused by the protection sheet 146 in the direction of the light guiding plate 120, and provides P wave of the light to the panel.

The S wave reflected by the reflective polarization film 148 is again reflected by the light guiding plate 120 or the reflector 130. As a result, the reflected S wave is changed into light including P wave and S wave.

The changed light is again incident to the reflective polarization film 148 through the diffuser 142, the prism sheet 144 and the protection sheet 146.

The BLU 100 enhances the efficiency of the light by using the above described method.

Hereinafter, the reflective polarization film 148 will be described in detail.

The reflective polarization film 148 included in the BLU 100 employs a thin multi-layered reflective polarization film formed by depositing transparent substances having different refractive index. Here, a representative reflective polarization film 148 is DBEF (dual brightness enhancement film) of 3M Company. However, the thin multi-layered reflective polarization film is not good in the transmission efficiency for a particular wavelength and also is not good in the reflection efficiency for other wavelength. Accordingly, the following reflective polarization film shown in FIG. 1B has been developed so as to enhance the polarization characteristics of the thin multi-layered reflective polarization film.

FIG. 1B is a perspective view illustrating a reflective polarization film employed in the BLU of FIG. 1A.

In FIG. 1B, a reflective polarization film 148 employed in the BLU 100 as a wire grid polarization film is manufactured by forming fine metal patterns 152 on a transparent substrate 150. Here, the metal patterns 152 are formed by forming a metal thin film on the transparent substrate 150, and then irradiating a polarized laser beam on the metal thin film. This is disclosed in Korean application number 2005-40544.

In the above reflective polarization film 148, the interval of the metal patterns 152 should be formed finely so that the reflective polarization film 148 performs desired polarization function. However, it is difficult to form accurately the metal patterns 152 on the transparent substrate 150, and so a process of manufacturing one reflective polarization film 148 has to be long. Accordingly, it is difficult to manufacture in great quantities the reflective polarization film 148.

SUMMARY OF THE INVENTION

It is a feature of the present invention to provide a backlight unit having a polarization film for functioning reflective polarization film by using UV curing resin and metal substance and a method of manufacturing the polarization film.

In addition, it is another feature of the present invention to provide a method of manufacturing a polarization film employed in a backlight unit capable of manufacturing in great quantities the polarization film and reducing a manufacture period of the polarization film.

A backlight unit according to one embodiment of the present invention includes a light source, an optical film and a polarization film. The light source emits a light having a certain wavelength. The optical film is located proximate to the light source to transmit the light outputted from the light source in a certain direction. The polarization film is located proximate to the optical film. Here, the polarization film has a UV curing resin and lines disposed on the UV curing resin, and polarize the light transmitted from the optical film.

A display apparatus according to one embodiment of the present invention includes a light source, an optical film, a polarization film and a panel. The light source emits a light having a certain wavelength. The optical film is located proximate to the light source to transmit the light emitted from the light source. The polarization film is located proximate to the optical film to transmit some of the light from the optical film. The panel displays an image by using the light transmitted through the polarization film. The polarization film includes a transparent film, a UV curing resin formed on the transparent film, and a plurality of metal lines disposed on the UV curing resin.

A method of manufacturing a polarization film according to one embodiment of the present invention includes applying a UV curing resin on a transparent film; disposing a film in which pattern is formed at a location corresponding to the lines on the UV curing resin; irradiating ultraviolet rays on the film for a certain period of time; removing the irradiated film to form a layer having a predetermined pattern on the transparent film; and applying a metal substance onto the layer to form a plurality of lines on the layer.

As described above, a backlight unit and a method of manufacturing a polarization film in the same according to one embodiment of the present invention manufacture the polarization film by using UV curing resin and metal substance, and thus the manufacture period of the polarization film may be reduced. Accordingly, the polarization film may be manufactured in great quantities.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF EMBODIMENTS

Hereinafter, the preferred embodiments of the present invention will be explained in more detail with reference to the accompanying drawings.

Figure 1A:
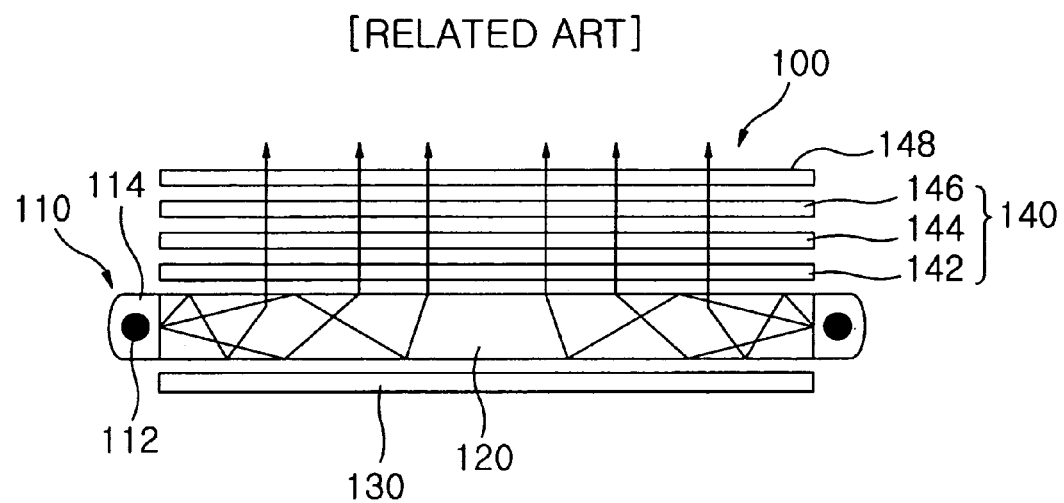
FIG. 1A is a sectional view illustrating the BLU in the LCD.
Figure 1B:
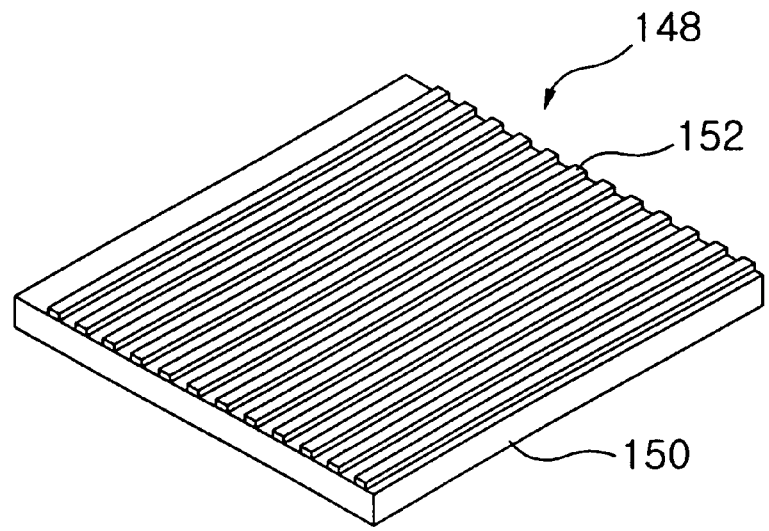
FIG. 1B is a perspective view illustrating a reflective polarization film employed in the BLU of FIG. 1A.
Figure 2:
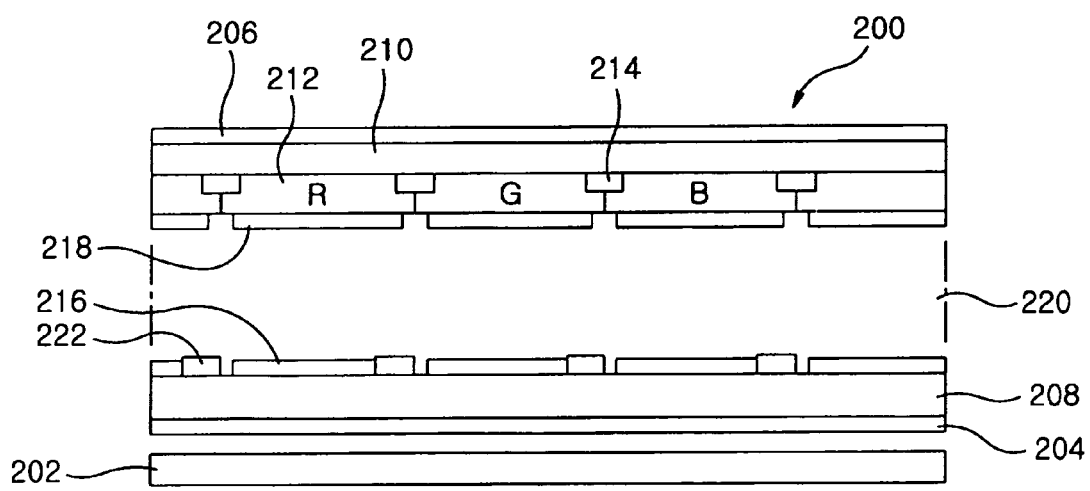
FIG. 2 is a sectional view illustrating a liquid crystal display employing a backlight unit according to one embodiment of the present invention.
Figure 3A:
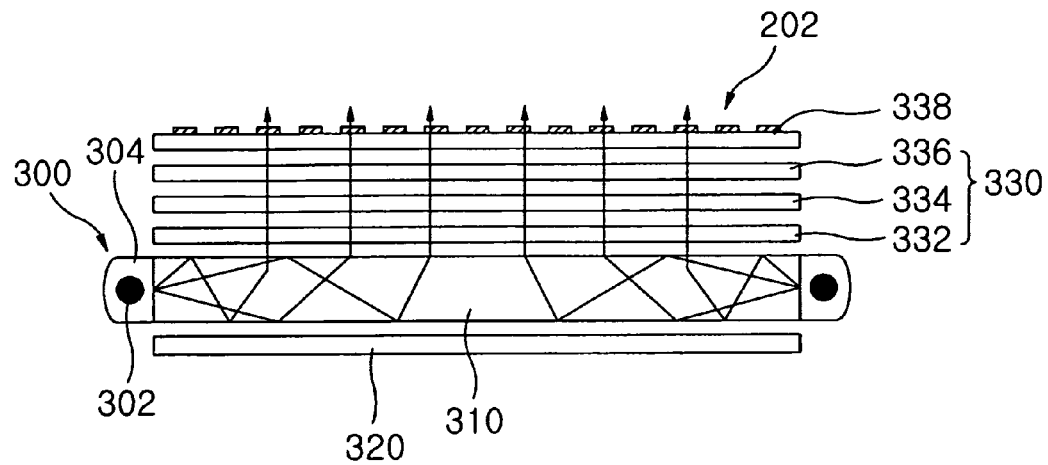
FIG. 3A to FIG. 3C are sectional views illustrating the backlight unit according to one embodiment of the present invention.
Figure 3B:
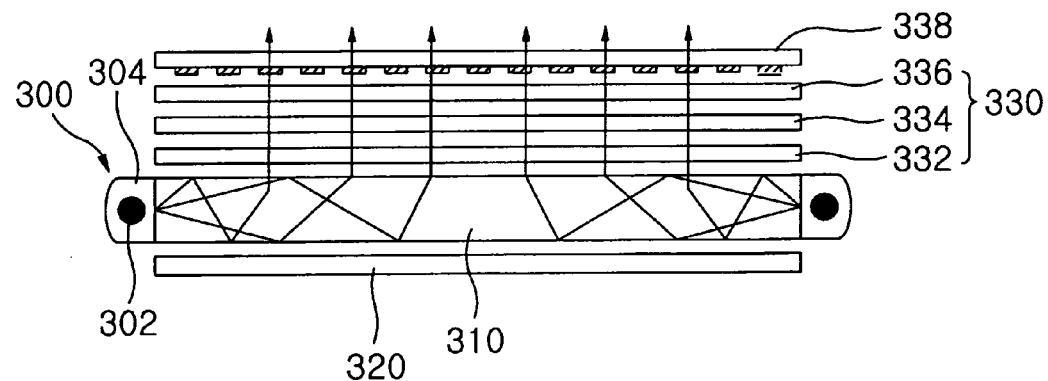
Figure 3C:
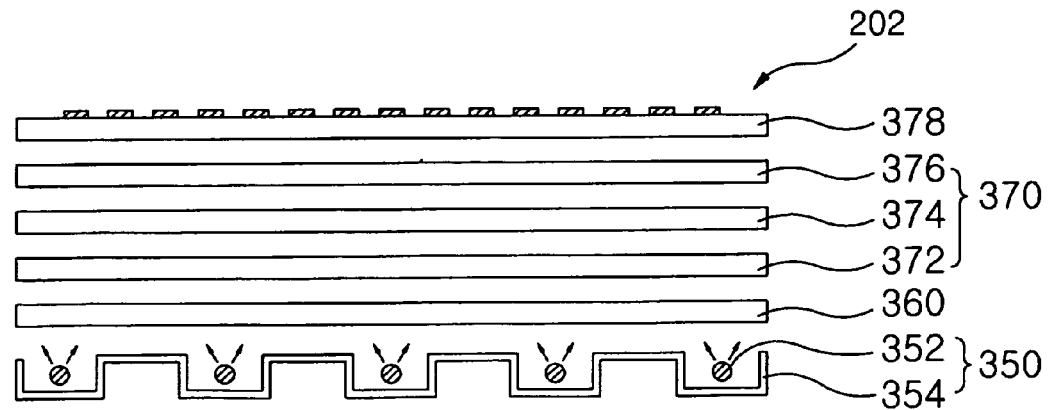

FIG. 2 is a sectional view illustrating a liquid crystal display employing a backlight unit according to one embodiment of the present invention. FIG. 3A to FIG. 3C are sectional views illustrating the backlight unit according to one embodiment of the present invention.

In FIG. 2, the liquid crystal display (hereinafter, referred to as "LCD") includes a LCD panel 200 and a backlight unit (hereinafter, referred to as "BLU") 202.

The LCD panel 200 includes a lower polarization film 204, an upper polarization film 206, a lower glass substrate 208, an upper glass substrate 210, a color filter 212, a black matrix 214, a pixel electrode 216, a common electrode 218, a liquid crystal layer 220 and a TFT array 222.

The color filter 212 includes sub-color filters corresponding to red, green and blue light.

The TFT array 222 as switching device switches the pixel electrode 216.

The common electrode 218 provides commonly a certain voltage to the color filter 212.

The pixel electrode 216 provides certain voltages to the red sub-color filter, the green sub-color filter and the blue sub-color filter.

The pixel electrode 216 and the common electrode 218 array liquid crystals included in the liquid crystal layer 220 in accordance with the voltages.

The liquid crystal layer 220 includes the liquid crystals, wherein the liquid crystals are arrayed depending on voltage difference of the pixel electrode 216 and the common electrode 218. As a result, a light transmitted from the backlight unit 202 is incident to the color filter 212 through the disposed liquid crystals.

The BLU 202 is located under the LCD panel 200, and provides a light, e.g. white light to the LCD panel 200.

The BLU 202 includes an edge-light type BLU where light source is located at side of a light guiding plate, and a direct-lighting type BLU where light source is located under a LCD panel. This will be described in detail with reference to the accompanying FIG. 3A to FIG. 3C.

In FIG. 3A, the BLU 202 as edge-light type BLU includes a light source unit 300, a light guiding plate 310, a reflector 320, an optical film 330 and a polarization film 338.

The light source unit 300 is located at side of the BLU 202, and includes at least one light source 302, e.g. cold cathode fluorescent lamp (hereinafter, referred to as "CCFL") and a light source reflector 304. Here, the light source 302 is not limited to the CCFL corresponding to linear light.

For example, point light source such as light emitting diode (LED), etc. as the light source 302 may be employed. For another example, surface light source such as external electrode fluorescent lamp (EEFL) may be employed. Here, when the EEFL is employed as the light source 302, the BLU 202 may not include a light guiding plate because the EEFL emits a surface light.

Hereinafter, the light source 302 will be assumed as the CCFL for convenience of the description.

The CCFL 302 provides a very bright white light, and does not emit heat.

The light source reflector 304 packages the CCFL 302, and reflects a light emitted from the CCFL 302 so that the light is incident into side of the light guiding plate 310. Here, the light source reflector 304 is made up of substance having high reflectivity. In addition, the surface of the light source reflector 304 may be coated with silver (Ag).

The reflector 320 is located under the light guiding plate 310, and reflects a light leaked from the light guiding plate 310 in a direction of the light guiding plate 310. This reflector 320 is manufactured by coating silver (Ag) on a basic substance made up of aluminum (Al), etc. Here, a process of manufacturing the reflector 320 may further include titanium coating process so as to prevent the reflector 320 from heat.

The light guiding plate 310 is designed to totally reflect a light incident from the light source unit 300 above a critical angle as shown in FIG. 3A, and is made up of transparent acryl resin such as poly methyl methacrylate (PMMA).

In addition, the light guiding plate 310 transmits the light incident from the light source unit 300 in a direction of the LCD panel 200.

The optical film 330 includes a diffuser 332, a prism sheet 334 and a protection sheet 336.

The diffuser 332 diffuses or condenses a light transmitted from the light guiding plate 310 in accordance with the angle between the light transmitted from the light guiding plate 310 and normal of the light guiding plate 310.

The prism sheet 334 condenses some of the light diffused or condensed by the diffuser 332 in a direction of the protection sheet 336.

Optionally, the protection sheet 336 may be located over the prism sheet 334, and protects the prism sheet 334 from dust, etc. In addition, the protection sheet 336 diffuses light condensed by the prism sheet 334 to increase the view angle of the LCD narrowed by the prism sheet 334.

The polarization film 338 reflects a part of the light diffused by the protection sheet 336 in a direction of the light guiding plate 310 using metal patterns formed thereon, and provides the other light to the LCD panel 200. For example, the polarization film 338 provides P wave of the light transmitted through the prism sheet 334 or the protection sheet 336 to the LCD panel 200, and reflects S wave of the light in a direction of the light guiding plate 310.

The S wave reflected by the polarization film 338 is again reflected by the light guiding plate 310 or the reflector 320, and so the S wave reflected by the polarization film 338 is changed into a light including P wave and S wave.

Subsequently, the changed light is again incident to the polarization film 338 through the diffuser 332, the prism sheet 334 and optionally the protection sheet 336. In this case, P wave of the changed light is transmitted to the LCD panel 200 through the polarization film 338, and S wave of the changed light is reflected in a direction of the light guiding plate 310 by the polarization film 338.

Then, the reflected light is again reflected by the light guiding plate 310 or the reflector 320, and so the reflected light is changed into a light including P wave and S wave.

The BLU 202 enhances the efficiency of a light by repeating the above process.

In the BLU 202 according to another embodiment of the present invention, the metal patterns formed on the polarization film 338 may be located toward the light guiding plate 310 as shown in FIG. 3B.

The BLU 202 according to still another embodiment of the present invention may not include the protection sheet 336.

In FIG. 3C, the BLU 202 as direct-lighting type BLU includes a light source unit 350, a transparent acryl plate 360, an optical film 370 and a polarization film 378. The optical film 370 includes a diffuser 372, a prism sheet 374 and a protection sheet 376.

Since elements of the present invention except the light source unit 350 and the transparent acryl plate 360 is the same as in the BLU in FIG. 3A and FIG. 3B, any further description concerning to the same elements will be omitted.

The light source unit 350 includes a plurality of light sources 352 and a light source reflector 354.

The light source reflector 354 packages the light sources 352, and reflects a light emitted from the light sources 352 in a direction of the optical film 370. Here, the light source reflector 354 is made up of substance having high reflectivity. In addition, the surface of the light source reflector 354 may be coated with silver (Ag).

The transparent acryl plate 360 transmits a light outputted from the light source unit 350, and preferably is made up of PMMA. Here, a pattern or no pattern is formed on the transparent acryl plate 360.

Hereinafter, a process of driving the LCD will be described in detail.

Now referring to FIG. 2, the BLU 202 provides a light to the LCD panel 200.

Subsequently, the TFT array 222 switches the pixel electrode 216.

Then, a certain voltage is provided to the pixel electrode 216 and the common electrode 218, and so the liquid crystals included in the liquid crystal layer 220 are disposed depending on the voltage.

The light provided from the BLU 202 is transmitted through the liquid crystal layer 220 and the color filter 212, and so an image is displayed on the LCD panel 200. Here, one red sub-color filter, one green sub-color filter and one blue sub-color filter form one pixel.

Hereinafter, a method of manufacturing the polarization film 338 employed in the BLU 202 will be described in detail.

FIG. 4A to FIG. 4D are sectional views a process of manufacturing the polarization film according to one embodiment of the present invention. FIG. 4E and FIG. 4F are sectional view and perspective view illustrating the polarization film manufactured by the process in FIG. 4A to FIG. 4D.

Figure 4A:
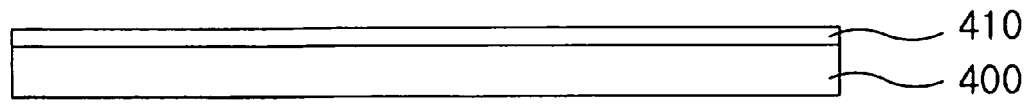
FIG. 4A to FIG. 4D are sectional views a process of manufacturing the polarization film according to one embodiment of the present invention.

As shown in FIG. 4A, UV curing resin 410 is applied on a transparent film 400. Here, the transparent film 400 is polyethylene terephthalate (PET) film, and the UV curing resin 410 is high polymer blend including a certain component reacting to ultraviolet rays (UV). On the other hand, the transparent film 400 is not limited to PET film.

Figure 4B:
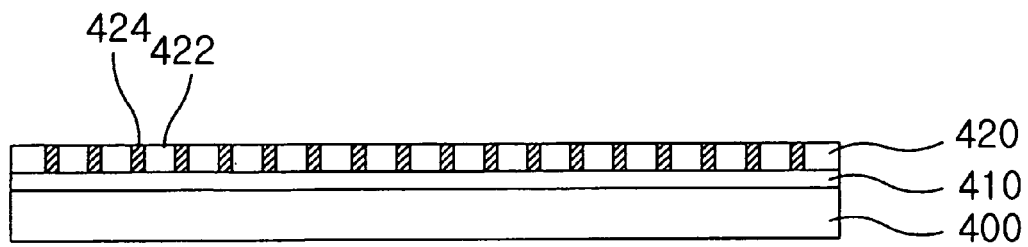

Subsequently, a film 420 where a plurality of lines 424 having constant interval are formed is adhered or disposed on the UV curing resin 410 as shown in FIG. 4B. Here, the lines 424 are made up of substance through which UV is not transmitted. Numeral 422 designates a UV transmitted parts of the film 420.

Figure 4C:
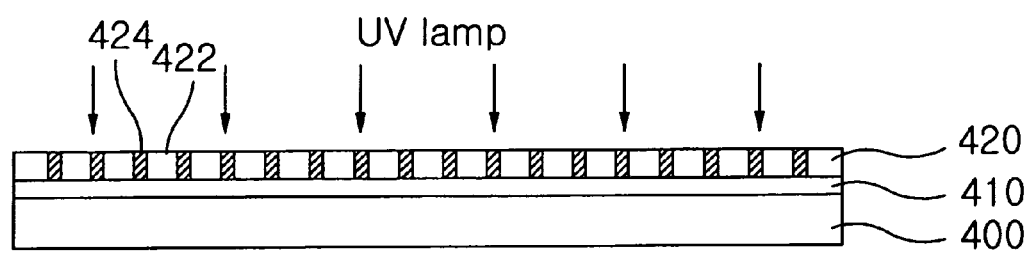

Then, UV emitted from the UV lamp is irradiated on the film 420 as shown in FIG. 4C. In this case, the UV curing resin 410 is cured by reacting to UV. Here, a plurality of first parts 414 corresponding to the lines 424 of the UV curing resin 410 are not cured because UV is not transmitted through the lines 424. However, a plurality of second parts 412 of the UV curing resin 410 are cured by UV because UV is transmitted through the second parts 422 of the film 420.

Figure 4D:
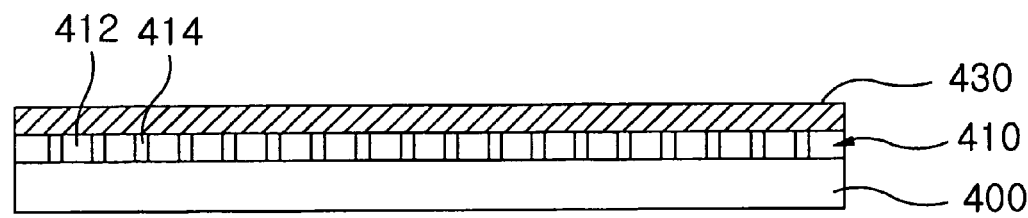
Figure 4E:
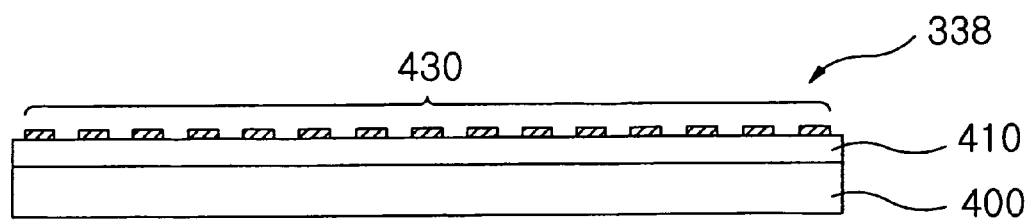
FIG. 4E and FIG. 4F are sectional and perspective views illustrating the polarization film manufactured by the process in FIG. 4A to FIG. 4D.
Figure 4F:
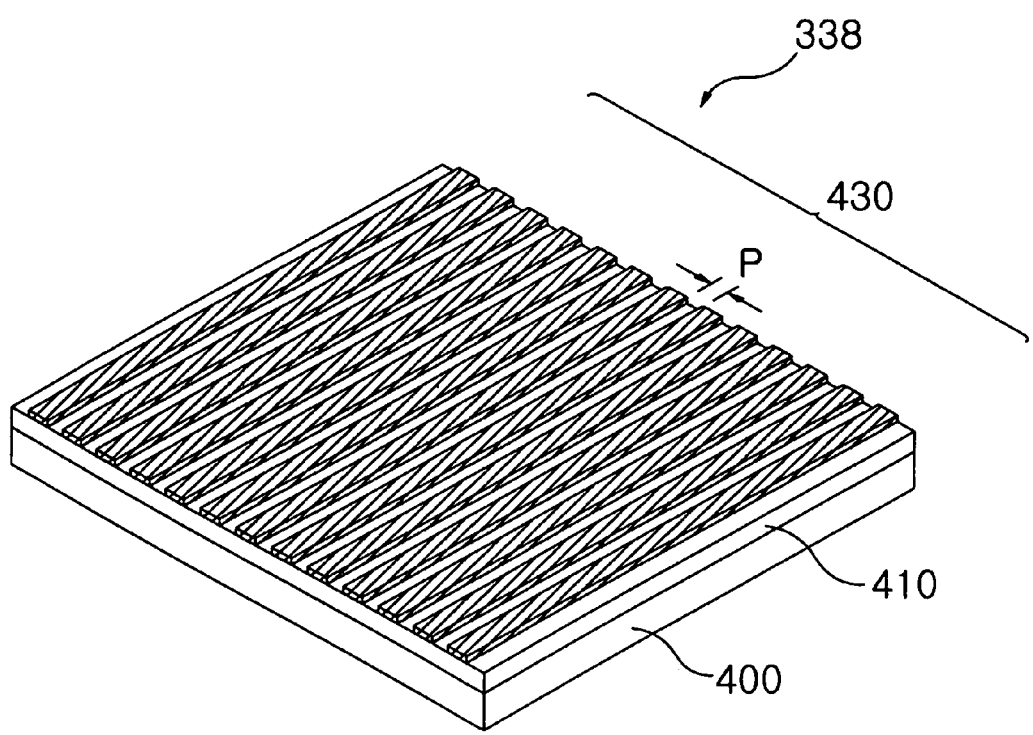

Subsequently, the film 420 adhered on the UV curing resin 410 is removed as shown in FIG. 4D.

Then, metal substance 430 is applied on the UV curing resin 410. In this case, metal having high reflectivity, for example, aluminum (Al), chromium (Cr) and silver (Ag), etc is used as the metal substance 430. Of course, the metal substance 430 is not limited to the above metals. Accordingly, the metal substance 430 is not adhered on a cured part of the UV curing resin 410, but is adhered on the other part of the UV curing resin 410 as shown in FIG. 4E and FIG. 4F. As a result, a plurality of lines having constant interval are formed on the UV curing resin 410. In other words, the polarization film 338 is manufactured.

The polarization film 338 according to one embodiment of the present invention performs the same function as a reflective polarization film described in Related Art when the interval of the lines is less than half wavelength of visible rays, i.e. about 100 nm to 350 nm. Preferably, the interval of the lines is about 120 mn.

In the above description, the metal substance 430 is applied on the UV curing resin 410 in thin film type as shown in FIG. 4D. However, the metal substance 430 may be applied on the UV curing resin 410 in powder type.

From the preferred embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

What is claimed is:

1. A backlight unit comprising:
   a light source configured to emit a light having a certain wave length;
   an optical film located proximate to the light source to transmit the light outputted from the light source in a certain direction; and a polarization film located proximate to the optical film, wherein the polarization film includes a transparent film, a substantially flat ultraviolet (UV) resin which includes a plurality of first parts and a plurality of second parts and formed on the entire surface of the transparent film and a plurality of metal lines disposed on the plurality of second parts of the UV resin, for polarizing the light transmitted from the optical film, and wherein the plurality of first parts are cured and wherein the plurality of second parts are uncured and formed between the plurality of first parts.

2. The backlight unit of claim 1, wherein the plurality of lines are substantially parallel to each other and at least one interval between the period of lines is about 100 nm to 350 nm.

3. The backlight unit of claim 2, wherein the plurality of lines are substantially parallel to each other and the interval between the lines is about 120 nm.

4. The backlight unit of claim 1, wherein the metal is one selected from the group consisting of aluminum (Al), chromium (Cr), and silver (Ag).

5. The backlight unit of claim 1, wherein the optical film includes:
  a diffuser configured to diffuse the light outputted from the light source; and
  a prism sheet configured to condense the light diffused by the diffuser.

6. The backlight unit of claim 1, wherein the backlight unit is employed in a liquid crystal display.

7. A display apparatus comprising:
  a light source configured to emit a light having a certain wavelength;
  an optical film located proximate to the light source to transmit the light emitted from the light source;
  a polarization film located proximate to the optical film to transmit some of the light from the optical film; and
  a panel configured to display an image by using the light transmitted through the polarization film,
  wherein the polarization film includes:
  a transparent film;
  a substantially flat UV resin which includes a plurality of first parts and a plurality of second parts and formed on the entire surface of the transparent film; and
  a plurality of metal lines disposed on the plurality of second parts of the UV resin, wherein the plurality of first parts are cured and the plurality of second parts are uncured and formed between the plurality of the first parts.

8. The display apparatus of claim 7, wherein the plurality of metal lines are substantially parallel to each other and at least one interval between the metal lines is about 100 nm to 350 nm.

9. The display apparatus of claim 8, wherein the plurality of metal lines are substantially parallel to each other and the interval between the metal lines is about 120 nm.

10. The display apparatus of claim 7, wherein the metal lines are formed of one selected from the group consisting of aluminum (Al), chromium (Cr) and silver (Ag).

11. The display apparatus of claim 7, wherein the display apparatus is a liquid crystal display.

12. A method of manufacturing a polarization film comprising:
  applying a UV resin on an entire surface of a transparent film;
  disposing a film on the UV resin, the film having a plurality of line patterns made up of substance through which UV is not transmitted;
  irradiating ultraviolet rays on the film for curing a plurality of first parts of the UV resin;
  removing the irradiated film to form the plurality of first parts and a plurality of second parts, the plurality of second parts are not cured and formed between the plurality of first parts; and
  applying a metal substance onto the plurality of second parts to form a plurality of metal lines on the plurality of second parts.

13. The method of claim 12, wherein the step of forming the metal lines includes:
  applying the metal substance onto the plurality of first parts and the plurality of second parts, wherein the metal lines are formed by bonding the metal substance on only the plurality of second parts.

14. The method of claim 12, wherein the plurality of metal lines are substantially parallel to each other and at least one interval between the metal lines is about 100 nm to 350 nm.

15. The method of claim 14, wherein the plurality of metal lines are substantially parallel to each other and the interval between the metal lines is about 120 nm.

16. The method of claim 12, wherein the metal substance is made up of one selected from the group consisting of aluminum (Al), chromium (Cr) and silver (Ag).

* * * * *